United States Patent [19]

Szeto

[11] Patent Number: 4,663,777
[45] Date of Patent: May 5, 1987

[54] APPARATUS FOR CONTROLLING DIGITAL VOICE RECORDING AND PLAYBACK OVER TELEPHONE LINES AND ADAPTED FOR USE WITH STANDARD HOST COMPUTERS

[76] Inventor: Charles Szeto, 38 Ellis St., Medway, Mass. 02053

[21] Appl. No.: 682,164

[22] Filed: Dec. 17, 1984

[51] Int. Cl.⁴ ............................................. H04M 3/50
[52] U.S. Cl. ........................................ 379/88; 379/84
[58] Field of Search ........... 179/18 B, 18 BA, 18 BE, 179/6.17, 6.02, 2 DP, 27 FH, 27 FG

[56] References Cited

U.S. PATENT DOCUMENTS

| | | | |
|---|---|---|---|
| 4,371,752 | 2/1983 | Matthews et al. | 179/7.1 TP |
| 4,375,083 | 2/1983 | Maxemchuk | 364/900 |
| 4,385,359 | 5/1983 | Watari et al. | 364/513 |
| 4,489,438 | 12/1984 | Hughes | 381/51 |
| 4,523,055 | 6/1985 | Hohl et al. | 179/2 DP |
| 4,527,012 | 7/1985 | Caplan et al. | 179/18 ES |
| 4,554,418 | 11/1985 | Toy | 179/2 DP |

OTHER PUBLICATIONS

"Digital Voice Store-and-Forward System Answers the Phones, Takes Messages", Holding and Taylor, *Electronics*, Apr. 21, 1981, pp. 139-143.

Primary Examiner—Thomas W. Brown
Attorney, Agent, or Firm—Rines and Rines, Shapiro and Shapiro

[57] ABSTRACT

A method of enabling the efficient use of a standard host computer with a voice message processing apparatus using a telephone interface and voice processing system, that comprises, providing a universal supervisory circuit between the host computer and the telephone interface and voice processing system, the circuit having a memory that stores data of a type useful to interface with said telephone and voice processing interface system, the circuit performing the steps of receiving standard serial data from the host computer such as telephone answering, voice message storing and other commands; storing in the supervisory circuit memory particular serial data commands tailored to command and control the telephone interface and voice processing system; using the data stored in the memory to translate said received standard serial data from the host computer into command and control language recognizable by the telephone interface and voice processing system; converting the translated language into parallel data; and prioritizing the application of said parallel data to said telephone interface and voice processing system for efficient transmission to the telephone interface system; the telephone interface and voice processing system generating parallel data, such as line-ringing and other status data, translated by the supervisory circuit into standard serial data recognizable by the host computer; and prioritizing the transmission of the last-named standard serial data to the host computer.

11 Claims, 11 Drawing Figures

APPARATUS FOR CONTROLLING DIGITAL VOICE RECORDING AND PLAYBACK OVER TELEPHONE LINES AND ADAPTED FOR USE WITH STANDARD HOST COMPUTERS

The present invention relates to a means for controlling digital audio recording and playback systems designed for connection to telephone lines, being more particularly directed to a controller or supervisor used in connection with a host computer, a telephone interface system and a voice processing system for receiving and sending digitized voice recordings from and over a telephone line.

Recording and playback of voice messages is often useful in business applications. This capability is useful for order entry systems, for dictation for subsequent transcription, for obtaining spoken output from a computer data base, or simply to take the place of written communications in the transmittal of information. Numerous methods have been proposed to satisfy this need. The present invention relates only to digital voice messaging systems.

In the recording mode, the digital voice system such as shown in U.S. Pat. No. 4,371,752, first produces a stream of digital data which represents the audio message signal; this stream of digital data is then recorded on a digital memory, such as a magnetic disk recorder ("Winchester" disk).

In the playback mode, the Winchester disk is accessed for a particular message, the message is converted into a stream of digital data which is, in turn, converted to an audio signal. Because such a system operates at very high speed, up to 32 lines of recording and playback can be simultaneously accommodated without the introduction of delays which are perceptible to the users.

A common source of audio messages for recording and a common method of accessing messages for playback is a telephone line. Telephone lines may be part of the public switched telephone network or they may be a part of a business telephone system under the control of a private branch exchange (PBX) in the business premise. However, prior systems required a custom or specific dedicated host computer, directly connected by a parallel bus device to all input/output, processing and memory hardware to provide the needed operational speed discussed above. Changes in the system, such as necessitated by increased message mode on the system, that would require a change in the capacity or type of host computer, could therefore not be accomplished without re-designing the entire system, or at least the internal communications bus system, to satisfy the communications protocol of the new computer. Additionally, the dedicated custom computer of prior bundled systems may lack flexibility to handle other processing needs and may not be suitable for the general needs or other needs of the user as well as expanded voice messaging needs.

The present invention relates to an unbundled system, whereby any of a wide variety of standard host computers can be connected to the telephone lines and the voice storage and playback means and may be controlled by outside means (usually by a host computer) to provide a system which can be used for the purposes described above and other purposes. Such unbundling, or severing of the bus-connected custom system would normally entail a loss of efficiency and speed. However, the present invention provides for a general purpose host computer to be easily connected to a standard telephone line interface and a standard voice processing system without sacrificing speed or efficiency. Such connection is facilitated by a novel electronic communications supervisor that provides distributed processing from the host computer and allows for the utilization of a standard host computer as a voice messaging system controller, without substantial system re-design to facilitate changes in the computer.

Therefore, it is an object of the present invention to provide a novel electronic communications supervisor for connection to a host computer, telephone line interface system and voice processing system that is not subject to prior limitations but instead allows for any of a wide variety of standard host computers to be used as a voice messaging controller without loss of speed or efficiency.

Another object is to provide a novel electronic communications supervisor that provides distributed processing control functions to release the host computer from such functions.

Other and further objects will be explained hereinafter and are more particularly delineated in the appended claims.

In summary, in one of its important applications, the invention embraces an electronic communications supervisor for controlling digital recording and playback of voice messages for connection to a telephone line interface, a voice processor and a host computer, having, in combination, electronic digital signal processing means for controlling the operation of the supervisor; parallel means for receiving and transmitting digital control signals between the telephone line interface and said electronic digital signal processing means to provide access to telephone lines for voice messages; parallel means for receiving and transmitting digital control signals between the voice processor and said electronic digital signal processing means for controlling voice messages; analog audio lines for transmitting voice messages between the telephone line interface and the voice processor under control of the electronic digital signal processing means, the voice processor having means for converting said voice messages into digital data signals representing voice messages and for converting digital data signals representing voice messages into voice messages; digital memory means controlled by said electronic digital signal processing means for storing said digital control signals; digital memory means controlled by said voice processor for storing digital data representations of the voice messages; means for storing in the last-mentioned memory means said digital data representations of the voice messages from said voice processor; and serial means for receiving and transmitting digital control signals between the host computer and the electronic digital signal processing means. Other inventive features and preferred constructional details are hereinafter described.

The invention will now be described with reference to the accompanying drawings:

FIG. 1 of which is a schematic drawing of a voice messaging system having a universal supervisor circuit connected to a host computer, a telephone line interface and a voice processing system;

FIG. 2. is a more detailed schematic, similar to FIG. 1, showing the universal supervisor circuit of the present invention;

Figure 1:
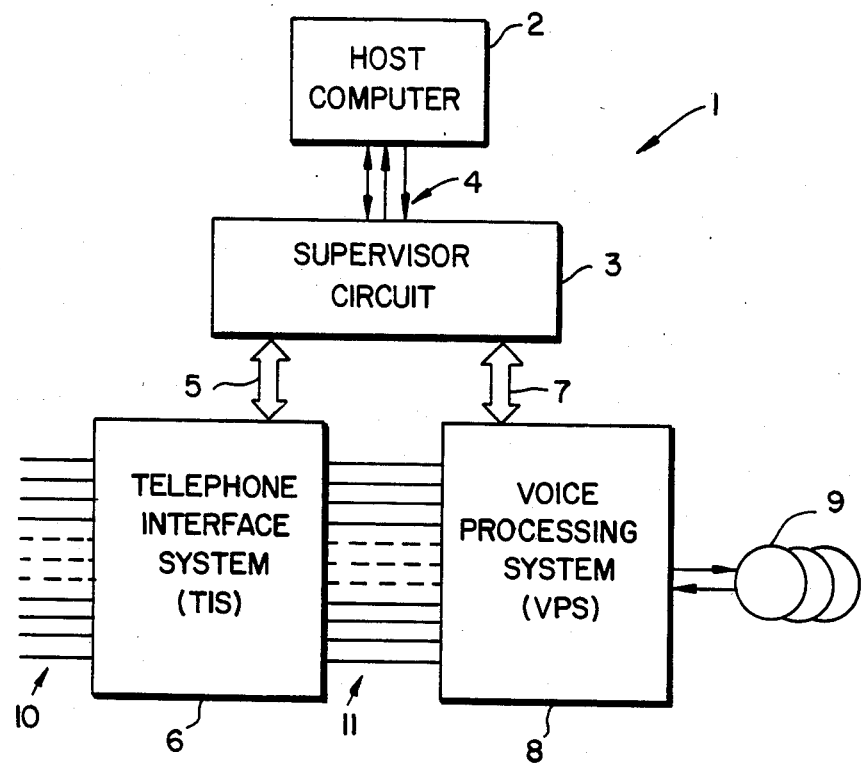

Referring now to FIG. 1, a voice messaging system 1 having a host computer 2 is connected to a universal supervisor circuit 3 by serial communication lines 4; the supervisor circuit 3 is connected, in turn by a parallel bus communication line 5 to a telephone interface system (TIS) 6 and by a parallel bus communication line 7 to a voice processing system (VPS) 8 with associated Winchester disks 9. In the typical application, up to 32 telephone lines 10 are connected to the TIS 6 which is connected to up to 32 audio signal lines 11 to the VPS 8 as will be described in more detail hereinafter.

The host computer 2 may be any type of machine which can exchange information using a standard serial protocol, such as RS 232-C, an attribute of almost all computers. The host computer 2 operates using a program which is designed to handle the particular application for which the system is intended. The supervisor 3 will store commands (digital signals) from the host computer 2 and commands tailored to command and control the TIS 6 and VPS 8 and translate such commands and data into a command and control language recognizable by the TIS 6 and VPS 8 and convert the translated language into parallel data signals, as will be described in detail hereinafter.

The TIS 6 provides a telephone line connection which meets the requirements of the Federal Communications Commission designed to protect the public switched network such as the model 50 sold by Voice-Tek Corporation, Newton, Mass. The TIS 6 contains no 'intelligence'; it simply serves to answer any telephone line 10 when the telephone line 10 calls for service (for instance, by imposing a ringing signal) by providing an audio path along lines 11 to the voice processing system 8. It is also capable of collecting and providing various signals to the telephone lines 10 provided by or required by a switched network, such as a PBX or Central Office, to establish and maintain such an audio path. The nature of these signals depends on the type of telephone lines; for the simplest type of line, a subscriber loop for instance, the telephone interface system 6 answers a ring by providing a low DC resistance across the line 10. The switched network interprets this as an "off hook" condition; that is, someone has answered the telephone. The ringing signal is tripped off the line at the switched network's central office or PBX and an audio connection may proceed. All of these actions on the part of the telephone interface system 6 are controlled by the host computer 2, and status data representing actions are sent between the TIS 6 and the host computer 2. However, none are initiated by the telephone interface system 6 itself.

The voice processing system 8, such as the model 30 sold by VoiceTek Corporation, may have considerable internal 'intelligence' related to the processing of the analog audio signals carried on lines 11 and digital signals, but it also relies on control signals, such as those sent in standard serial data format from the host computer 2, to function; it must be told which line 11 to service, whether the service involves recording or playing back a message; and identification of the message itself by the host computer.

The supervisor circuit 3 handles the interface between the telephone interface system 6, the voice processing system 8 and the host computer 2. The supervisor 3 also provides considerable intelligence which would otherwise require extensive programming at the host computer 2, thereby freeing the host computer for dealing with the application.

The heart of the control system of the voice messaging system 1 is the supervisor 3. In order to understand its operation and the advantages of using this equipment one must consider the requirements of the communications links between the supervisor 3 and the other parts of the system 1.

The host computer's universal method of communication is through a standard serial data RS 232-C serial protocol at communication lines 4. To send or receive information, the computer 2 generates or expects to receive a 'text string', that is a series of digital pulses on its RS 232-C transmit or receive line which may be encoded as a series of ASCII (American Standard Code for Information Interchange) characters. Such standard serial data would include signals controlling telephone answering, voice message storing and other commands as described below.

The telephone interface system 6 receives and sends information by using a "bus" structure designated at 5. The bus 5 is a set of parallel electrical lines on which a set of voltages may be impressed to send information from the supervisor 3 for reception by the telephone interface system 6 and vice versa. As with standard bus structures, the meaning of a given set of voltages on the bus 5 is unique to the particular telephone interface system 6 involved and is not covered by any standard protocol. Additionally, the voice processing system 8 communicates by using a parallel bus in the same way as the telephone interface system 6.

Thus one function of the supervisor 3 is to translate the serial RS 232-C commands generated by the host computer 2 into the appropriate form for communicating with the parallel bus 5 or 7 of either the telephone interface system 6 or the voice processing system 8, respectively. The supervisor 3 must also take the digital information generated by the telephone interface system 6 and the voice processing system 8 from their parallel busses 5 and 7 and translate that digital information into RS 232-C standard serial data character strings for transmittal to the host computer 2. The ability of the supervisor 3 to perform these tasks allows the system 1 to be used with any of a wide variety of standard host computers 2, thereby greatly increasing the applications utility of the host computer 2.

Both the telephone interface system (TIS) 6 and the voice processing system (VPS) 8 use the parallel bus system for communication because it is much faster than the serial system used for communication between the supervisor 3 and the host computer 2. The advantages of this speed are retained by using the supervisor 3, which can accumulate communications to and from the telephone interface system 6 and the voice processing system 8 and process them when time is available. The supervisor 3 also stores particular serial data commands tailored to command and control the TIS 6 and VPS 8, as described in more detail hereinafter.

Two other important and less obvious tasks can be supported by the supervisor 3: timing circuits and disk-to-disk transfer of information.

The protocol for handling telephone interface often involves the use of 'timeouts.' That is, the system 1 expects certain responses from the calling party; the calling party is given a limited (but generous) amount of time to provide these responses. If they are not forthcoming the system 1 must react, typically by providing a spoken prompt requesting the response or terminating the transaction by hanging up. Such timeouts are required because the system would otherwise become completely inoperable as lines remained open waiting for a response which never comes. Timeouts are usually provided by the host computer 2. The use of the supervisor 3 allows the timeout operations to be performed by the supervisor 3, thus relieving the host computer 2 of the programing required and speeding up the operation of the system 1.

The supervisor 3 also makes a convenient pathway for passing information on the voice recording disks 9 to the host computer 2 and for receiving information from the computer 2. This function is useful because it allows the voice messages on the voice recording disks 9 to be copied or 'backed up' on the host computer's disks (not shown). Thus if a failure occurs in one of the voice recording disks 9, the disk can be repaired and the information which was on it replaced from the host computer 2.

Finally, the supervisor 3 is a convenient place to generate various tones which are sometimes necessary in telephone communications; for instance a busy tone, ringing tone, dial tone, and so forth. These tones are audio signals which the supervisor 3 can direct to the telephone interface system 6 and place on one of the telephone lines 10 instead of requiring communication with the voice processing system 8.

Figure 2:
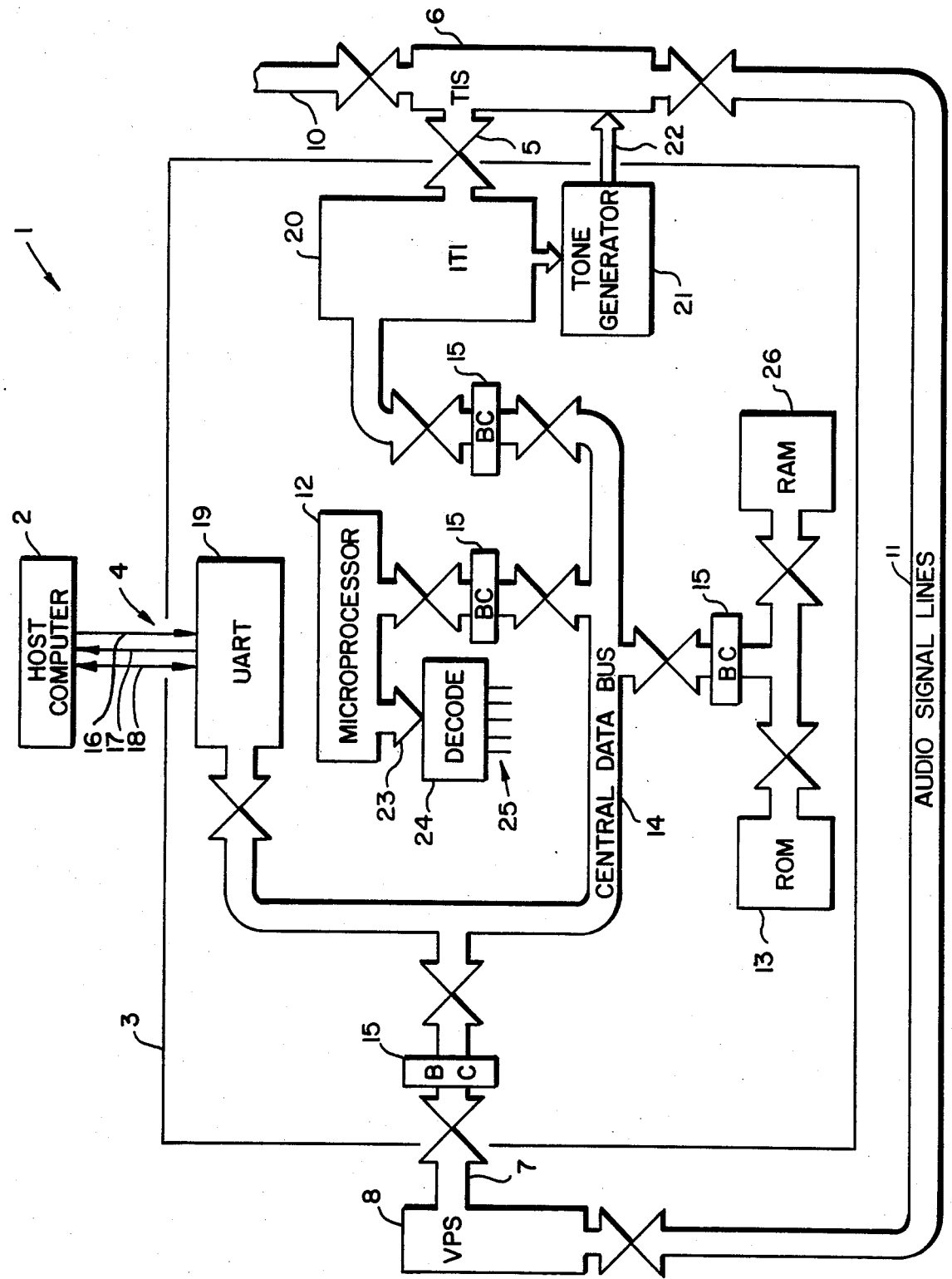

FIG. 2 shows a detailed block diagram of the supervisor 3 similar to FIG. 1, with like numerals designating like parts. For clarity, FIG. 2 omits control and addressing lines. As previously stated, supervisor 3 controls the exchange of information between the host computer 2, the voice processing system (VPS) 8 and the telephone interface system (TIS) 6 through the use of a microprocessor 12 operating under control of a program resident in read-only memory (ROM) 13.

Within the supervisor 3, digital information is passed from one part of the supervisor 3 to another by a central data bus 14, control of which is maintained by the microprocessor 12. Access to the bus 14 by the supervisor 3 auxiliary components is made possible by enabling the bus connectors (BC) 15. Thus, for instance, when the microprocessor 12 wishes to read the next instruction in the program maintained in ROM 13, the bus connector 15 between the microprocessor 12 and the central data bus 14 is enabled and the bus connector 15 between the ROM 13 and the central data bus 14 is enabled. The ROM 13 is then addressed at the location of the next instruction, places the instruction on the data bus 14, and the microprocessor 12 can then read the instruction from the central data bus 14.

The microprocessor 12 may be any of a number of devices such as the 8-bit Z80A; 16 or even 32-bit devices may also be used to increase speed of operation. The central data bus 14 will have 8 lines if an 8-bit processor is used; in such a case a good choice for a bus connector 15 when information must be passed in both directions is the LS245 device. To store the operating program for the system, a suitable ROM 13 for the Z80A microprocessor is the 2732 or 27128 device.

Communication with the host computer 2 takes place over an RS 232-C line 4 which includes a receive line 16, a transmit line 17 and control lines 18. These lines 16–18 are connected to a universal asynchronous receiver/transmitter (UART) 19 which, under the control of the microprocessor 12, will either take a character from the central data bus 14 and send it to the host computer 2 or accept a character from the host computer 2 and place it on the central data bus 14. If the Z80A is used as the microprocessor 12, a good choice for the UART 19 is the Z80A SIO/O device.

Communication with the VPS 8 takes place directly over the central data bus 14, assisted by control lines not shown in FIG. 2, when a VPS 8 such as the VoiceTek model 30 is used. The model 30 expects an 8-bit command on its data bus or supplies an 8-bit response on its data bus, and thus can be connected directly to the central data bus 14 when an 8-bit bus is used. Note, however, that these 8-bit codes are not necessarily representable as ASCII characters; they may take any form which is convenient.

Communication with the TIS 6 is a little more involved when a TIS 6 such as the VoiceTek model 50 is used, since the model 50 expects to receive and supply information over a large number of lines; an internal TIS interface (ITI) 20 is therefore necessary to translate between digital information signals which can be placed on the 8-bit central data bus 14 and command/status data signal input lines of bus 5 of the model 50 TIS 6. The model 50 TIS 6 also requires the supervisor 3 to supply a set of telephone signaling tones: a dial tone, busy tone, ring tone, and valid tone. A tone generator 21, coupled to the ITI 20 in the supervisor 3, provides these tones on command of the central microprocessor 12 (the command is passed through the ITI 20) to the TIS 6 over tone line bus 22 when required by the host computer 2.

Finally, the microprocessor 12 may address the various components of the supervisor 3 through a conventional address bus 23. Address information is decoded by a conventional decoder 24 and placed on lines 25 to various components of the supervisor 3 using any conventional technique. A random access memory or RAM 26 is also required by the supervisor 3 to handle intermediate storage of commands and other information, such as serial data commands tailored to command and control the TIS 6 and VPS 8, as described below. When the Z80A microprocessor 12 is used, the RAM 26 is made up of several 6264 chips or other RAM devices. Thus under the control of the host computer 2, voice messages may be exchanged between the voice processing system and telephone lines 10 by way of the TIS 6 and audio lines 11.

Figure 3:
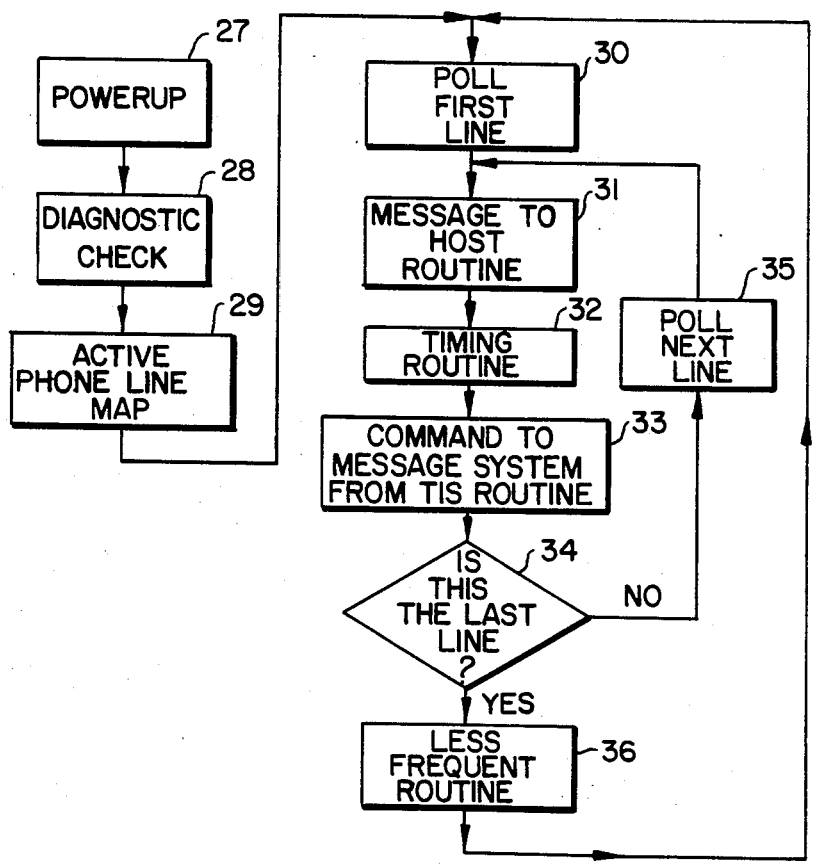
FIG. 3 is a flow chart of a standard processing routine used by the supervisor.

The operation of the supervisory circuit 3 can best be understood by understanding the operation of the resident program, which prioritizes the application of the parallel data signals to the TIS 6 and VPS 8, shown in simplified form in FIG. 3. The prioritizing of the parallel data provides efficient transmission to the TIS 6 and VPS 8, with the TIS 6 and VPS 8 generating parallel data such as line-ringing and other status data which is translated by the supervisor 3 into standard serial data, as described previously, recognizable by the host computer 2. The supervisor 3 also prioritizes the transmission of the standard serial data to the host computer 2, as will be described in more detail hereinafter.

Referring now to FIG. 3, upon powerup 27, the program directs a diagnostic check of the circuitry 28. Upon successful completion of the diagnostic check, the program directs a check on which of the telephone lines are active 29.

The VoiceTek Model 50 TIS 6, for instance, can be configured to interface with from 2 to 32 telephone lines 10 (in multiples of 2). The supervisor 3, as used with the model 50 TIS 6, therefore expects that up to 32 lines may be active. By sequentially polling the status of each line, the program determines if the line 10 position is active. As a result of the phone line map check 29 the program creates a table or "map" of the configuration of the TIS 6 which it places in RAM 26.

Upon completion of the TIS 6 map at 29, the program begins a loop, which, with the exception of certain interruptions (described below), will continue indefinitely. This loop may be set up in a number of different ways to service the tasks which must be performed; different methods of programming the loop will address the same tasks, but will address them more or less frequently, depending on the details of the program. The system described in FIG. 3 is an example of a loop which works well with the VoiceTek Model 50 TIS 6 and VoiceTek Model 30 VPS 8.

The program polls each of the active telephone lines in turn, performing several tasks at each stop. Then, before returning to poll the first telephone line again, the program will perform several other tasks. Typically each polling step will require 100 microseconds; if the full complement of 32 telephone lines is to be serviced, the entire loop will therefore take 4 milliseconds. Thus some tasks are performed relatively often (every 100 microseconds) and some tasks are performed less often (every 4 milliseconds). By choosing the correct mix of frequently performed tasks and less frequently performed tasks, system performance can be optimized.

When the program begins by polling the first active telephone line 10 at 30, it first performs the task of transmitting waiting messages to the host computer 2 at 31. (Both the VPS 8 and the TIS 6 generate messages for the host computer 2). All communication from the VPS 8 to the supervisor 3 is accomplished by the introduction of an interrupt. The interrupt causes the program to break out of the loop shown in FIG. 3 between steps 30 and 36 and to execute a routine which serves the VPS 8 and then returns control to the program of FIG. 3 at whatever point the interrupt broke in. This routine causes the microprocessor 12 to read the message from the VPS 8, translate it into a text string for transmittal to the host computer 2, and store the message in RAM 26.

The TIS 6 also generates messages for the host computer 2, for instance messages relating to the status of various timers and messages relating to the status of the telephone lines 10 (see below). In the normal course of the polling program, these messages are translated into text strings and placed in RAM 26 awaiting transmission to the host computer 2, along with the messages from the VPS 8.

All VPS 8 and TIS 6 messages for the host computer 2 are maintained in a RAM 26 area called the "host command queue." At this point in the polling program, the first character waiting in the queue, if any, is sent to the host computer 2. (The next and subsequent characters are sent upon the next and subsequent iteration of the polling program).

Some memory space is assigned in the RAM 26 to provide registers for maintaining times. Such timing registers are controlled by a timing routine 32. In a typical application, three registers are assigned to each line, thus up to 32×3=96 timers or "clocks" are available in the supervisor 3.

These register clocks are controlled by a master clock. Since the times of interest for control are never controlled with greater precision than a few tenths of a second, the master clock has a very long period, typically 30 milliseconds. Thus the program generally cycles through several polling cycles within a single master clock cycle.

The master clock is used to force a change of state in a one-bit register each cycle. The register clocks are updated by the program, which looks at the one-bit register and determines if it has changed its state since the last iterative pass. If it has, the program increments the contents of the three registers which are timing activities for the phone line 10 which the program is currently servicing. The register clocks may be used for various purposes, depending upon the application.

In a typical application, the first clock is reset and begins running when a request for service on the phone line 10 is answered, that is, when the line 10 goes off-hook. It is reset upon any subsequent command activity on the line 10. It thus times periods of inactivity. After incrementing the first clock, the program will read the register and report to the host computer 2 each time the register has recorded some established increment of time, for instance ten minutes. If thus warns the host computer 2 that an unreasonable amount of time has passed without activity on the line and the transaction should probably be terminated.

The second clock is reset and updated when a request for service on the phone line 10 is answered, that is, when the line goes off-hook. It continues to record time until the calling party has supplied appropriate information, as by touch-tone signals (typically his subscriber number and the code designating the type service the customer wants). After incrementing the clock, the program reads the register and if the required information does not appear within some preset time (say thirty seconds), the program informs the host computer 2, which can then initiate a voice message prompt for the missing information or hang up the line 10.

The third clock controls the interval during which one of the telephone signaling tones is placed on the line 10 at the command of the host computer 2. Thus if the host computer 2 requests the placement of a "beep" on the line 10, the tone generator 21 for the beep will be actuated and the third clock will be reset and updated. The program will read the register after each increment until the preset time for the "beep" elapses; the program will then turn the tone off.

All communication from the host computer 2 to the supervisor 3 is accomplished by the introduction of an interrupt. The interrupt causes the program to break out of the loop shown in FIG. 3 and to execute a command to message system from TIS routine 33 which serves the host computer 2 and then returns control to the program of FIG. 3 at whatever point the interrupt broke in. This command routine 33 causes the microprocessor 12 to determine whether the command is intended for the TIS 6 or the VPS 8 and writes the appropriate translation of the command into a preassigned area of RAM 26 for transmittal to either the TIS 6 or VPS 8 as previously described.

At this point in the program shown in FIG. 3, the memory space in RAM 26 and ROM 13 assigned to commands intended for the TIS 6 is checked to see if there are any commands for the line 10 which the program is currently servicing. If there are any, they are executed at this point by putting them on the data bus 14 to the ITI 20.

In addition to the messages to the host computer 2 dealing with timing information noted above, the polling program determines whether the line 10 currently being polled is calling for service (a ring on the line 10), if the calling party has hung up, the most recent digit recorded by a touch-tone decoder, and so forth. These messages are translated and placed in the host computer 2 command queue, described previously, at this point in the polling program.

The program now checks to see if it has reached the last active line at 34; if not, it considers the next active line at 35 and repeats the tasks described above. If the last active line has been served, however, noted at 34, before returning to the first line at 30 some additional tasks are performed. These tasks, called a less frequent routine 36, may have many functions such as a command to VPS 8 routine and the activation of a fourth timing clock, as described in more detail below.

As indicated above, commands from the host computer 2 to the TIS 6 or VPS 8 may appear at any time in the assigned area of RAM 26 as a consequence of interrupts. At this point in the program shown in FIG. 3, the memory space assigned to commands intended for VPS 8 is checked to see if there are any commands. If there are any, they are executed at this point by putting them on the data bus 14 to the VPS 8. Additionally, the fourth clock controls the off/on time for telephone signaling tones which require interruption, for instance the busy tone and the ringing tone. This clock runs continuously. The program will examine the register after each increment and will turn the tone off or on as appropriate whenever the time exceeds a preset amount.

Figure 4:
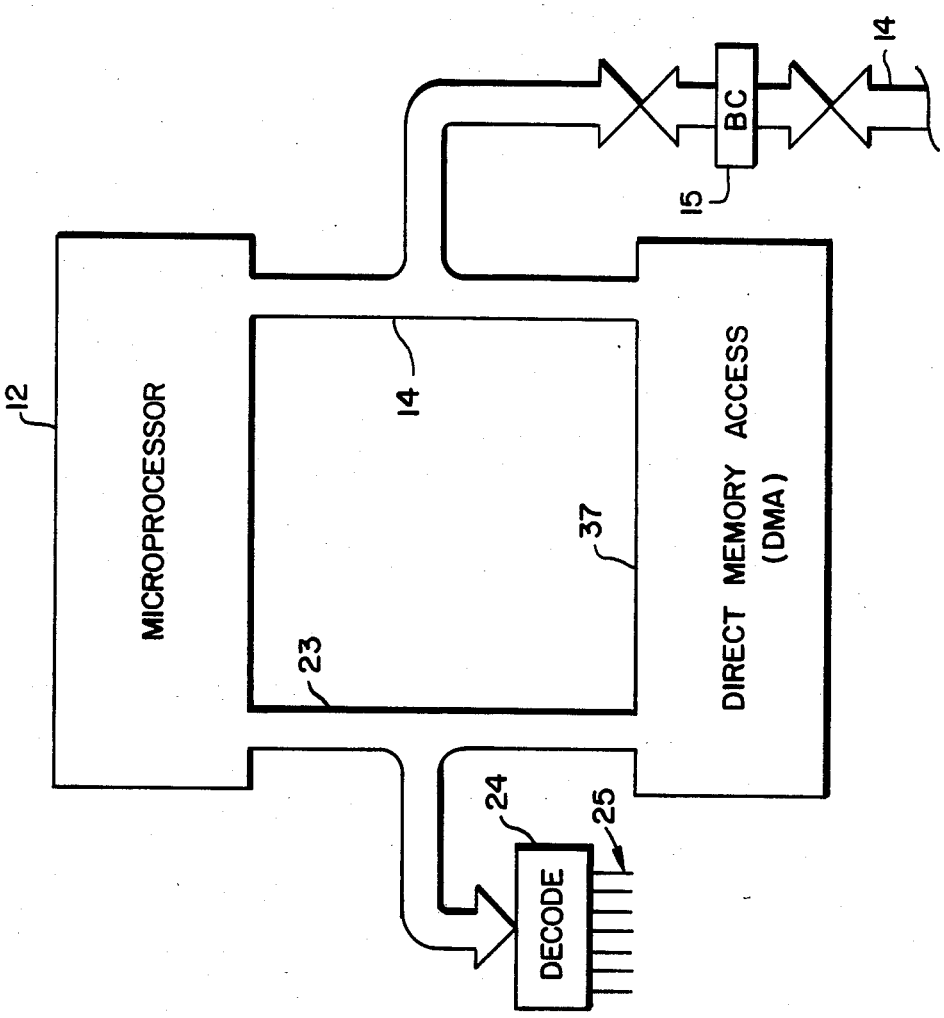
FIG. 4 shows a direct memory access in the supervisor to facilitate the transfer of digitized voice messages or long commands to and from the host computer.

For various reasons, it is sometimes useful to transfer digitized voice messages from the disk system of the host computer 2 to disks 9 maintained by the VPS 8. Additionally, the transfer of digitized voice messages from the VPS 8 disks 9 to the host computer 2 disks is also sometimes useful, such as for backup and error checking procedures. This process is greatly assisted by the addition of a direct memory access device 37 to the supervisor 3, as shown in FIG. 4. For such a disk-to-disk communication, the microprocessor 12 is assisted by the direct memory access (DMA) device 37 in transferring data to the data bus 14 via the bus connector 15, directed by the address bus 23 through decoding device 24 to and from the VPS 8 via lines 25. When a Z80A microprocessor is used, a good DMA device 37 is the Z80A DMA chip.

Transfer operations may be programmed in various ways, depending on the character of the VMX 8. The Voice-Tek Model 30 transfers data in 6K bytes. Thus the system of FIG. 4, when used with a model 30 as a VMX 8, is designed to handle data in 6K batches.

In transferring data, a second RS 232-C port may be used, which exists on many host computers 2, as well as on the UART 19 chip used in the example supervisor 3. By dedicating this second data channel to disk-to-disk transfers, such operation may be carried out as time permits, without disturbing the normal operation of the system 1. Such operations are termed "operations in the background."

As with all data transfers, data, including status data, is cached in the supervisor 3 RAM 26 in the process of transfer. Voice data from the host computer 2 is translated into a compatible 6K byte text string representation, sent over the second RS 232-C line, and cached in the supervisor RAM 26. When time permits, the 6K byte of voice data is transferred to the VPS 8 under control of the direct memory access device 37. This process is continued until the complete message has been transmitted.

The transmittal of voice data from the VPS 8 to the TIS 6 over lines 11 is therefore accomplished under the control of the direct memory access device 37 in passing 6K byte batches to the supervisor RAM 26 cache. Such data is then translated into text string representation and passed to the host computer 2 through the second RS 232-C channel. Such a method can also be used to transfer extended command strings.

Figure 5G:
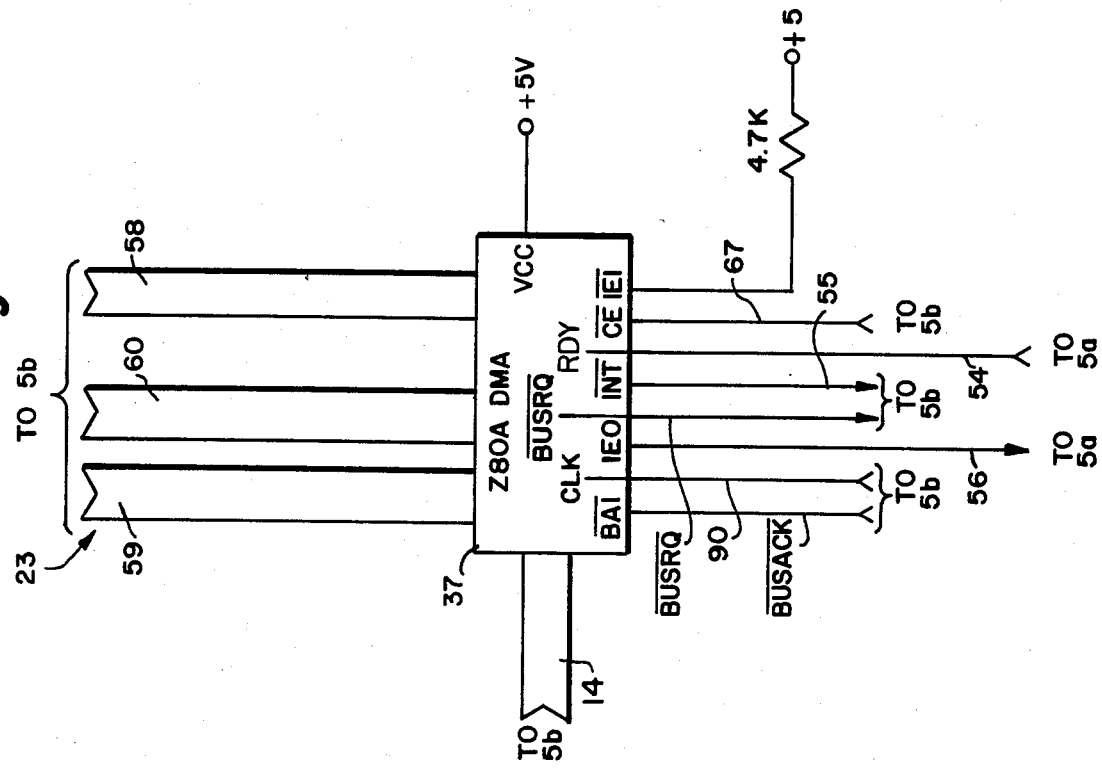
FIGS. 5a–5g are the schematic drawings of a preferred circuit of the present invention.
Figure 5A:
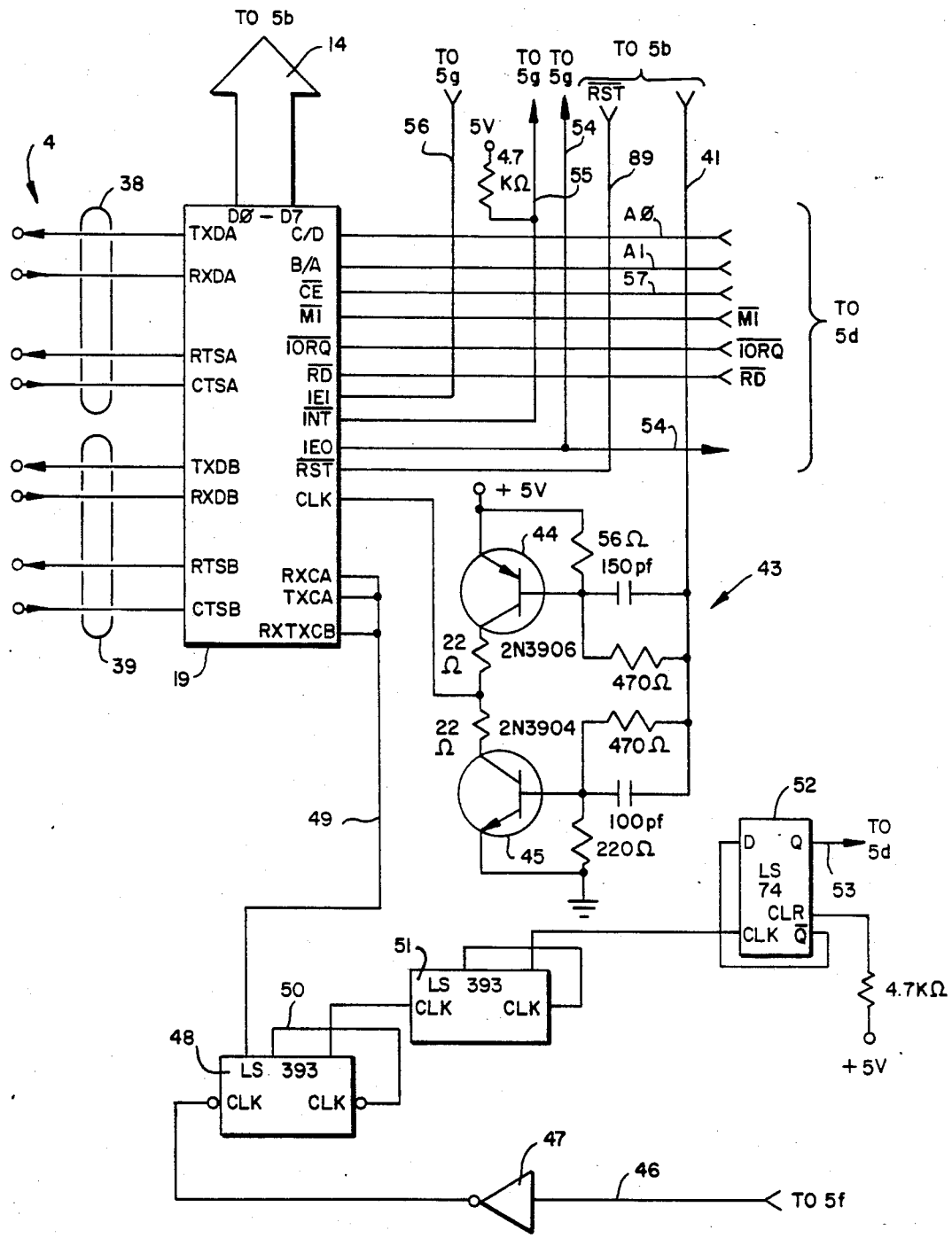

Referring now to the schematic drawings of FIGS. 5, a preferred supervisor circuit 3 is shown with industry standard components designated by numbers on FIGS. 5a–5g, and without all power connections or unused connections, for simplicity. FIG. 5a shows a typical realization of the circuitry for the UART 19 which communicates with the host computer 2. The UART 19 illustrated is the Z80A SIO/O, a device which is designed to interface with most commonly used microprocessors 12, such as the Z80A (see FIG. 5b). The UART 19 supports communication lines 4, shown as two RS 232-C lines 38 and 39, to the host computer 2; line 38 is used for command and information exchange with the host computer 2, and 39 is used for disk-to-disk transfers as described previously, or other transfers of large blocks of data. Some signal conditioning may be required on lines 38 and 39 depending on the nature of the RS 232-C ports available on the host computer 2 and the length of the connecting lines 4.

The two device ports of the UART 19 are labeled "A" corresponding to line 38 and "B" corresponding to line 39. Each has four lines: TXD, RXD, RTS and CTS. The TXD line carries data being transmitted from the supervisor circuit 3 to the host computer 2 in the RS 232-C serial format and corresponds to the transmit line 17 in FIG. 2. The RXD line carries data being transmitted from the host computer 2 to the supervisor circuit 3 and the RS 232-C serial format and corresponds to the receive line 16 in FIG. 2. Each port A and B also has two control lines; RTS (request to send) and CTS (clear to send), corresponding to the control lines 18 in FIG. 2. The RTS terminal is normally high, indicating that the device can accept signals from the host computer 2. If the internal buffer of the UART 19 is filled, this RTS terminal will be switched to a low signal, warning the host computer 2 not to send another character until space is available and the RTS terminal is switched to high. The host computer 2, on the other hand, can warn the UART 19 not to send characters to it by supplying a low signal on the CTS line, which is otherwise maintained in the high state by the host computer 2. Thus the RTS and CTS terminals are used to control the flow of information between host computer 2 and supervisor circuit 3 according to the RS 232-C protocol.

The data bus 14 consists of the data lines D0 through D7. This data bus 14 will contain a character which is to be sent to the host computer 2 (in parallel format) or will have impressed on it a character being transmitted by the host computer (in parallel format) to the supervisor circuit 3. These characters are generated and used as described previously in reference to the VPS 8, TIS 6 and the timing routine 32.

The UART 19 requires two clock signals. The first, carried by timing line 41, originates from the master clock 42 used to operate the microprocessor 12 (see FIG. 5b); being used to synchronize the operation of the UART 19 with that of the microprocessor 12. The clock signal is sharpened by the push-pull transistor amplifier 43 using transistors 44 and 45 and their associated circuitry. This clock signal is then applied to the CLK (clock) terminal of the UART 19. The second clock signal establishes the speed at which bits are transferred between the host computer 2 and UART 19. Preferably the highest standard speed for transfer possible is used, this rate being approximately 19.2 kHz. This signal, carried by timing line 46, is derived from the tone generating portion of the supervisor circuit 3, shown in FIG. 5f, and is sharpened by a Schmidt trigger type not gate 47 and is divided down to the appropriate frequency by frequency divider 48, and applied to UART 19 terminals RXC, TXC (receive and transmit clocks) and RXTXCB by line 49.

Further reduction by division of this frequency is accomplished by ganging the two units of the frequency divider together through line 50; the resultant low frequency signal being applied to a second frequency divider 51 and the resultant still lower frequency being divided once more by a factor of two by the flip-flop latch 52. The signal then carried by line 53 is the clock signal used to establish the timing routines described previously in regard to the timing routine 32.

The frequency imposed on the first divider 48 is 4.9152 mHz. The frequency supplied to the UART 19 (which is further divided within the UART 19) is one-fourth this value, that is 1.2288 mHz, to establish a 19.2 kHz transfer rate. Further division reduces the value of the signal on line 53 to 37.5 Hz (27 msec period).

The RST (reset) terminal of the UART 19 is driven low to place the device in an initial operating mode when power is applied or when a reset push button is actuated; the reset circuitry being discussed in greater detail in connection with FIG. 5B. Under normal operation this terminal is held high.

Line 54 IEO (interrupt enable output), line 55 INT (interrupt), and line 56 IEI (interrupt enable input) connections to the UART 19 are used to interrupt the microprocessor 12 and to establish the priority of the UART 19, automatically generating an interrupt (INT terminal goes low) whenever the host computer 2 sends a character. This interrupt signal is then carried by line 55. As discussed in more detail in connection with the DMA 37 circuit shown in FIG. 5g, a brief delay may occur before this character can be processed if the higher priority DAM 37 has established its priority by driving the IEO low on line 56. Interrupts from the UART 19 take priority over those generated by the VPS 8 and the TIS 6, however, as established by the connection of the IEO line 54 from the UART 19.

The RD (read) terminal of the UART 19 is held low if the device is to read data from the data bus 14; it is held high if the UART 14 is to write data to the data bus 14. The origin of the signal is the microprocessor 12 (shown in FIG. 5b and carried through bus 58 in FIGS. 5c and 5d).

The IORQ (input/output request) terminal of the UART 9 is driven low by the microprocessor 12, carried along bus 58, and line IORQ addresses an input/output device rather than the memory. When this IORQ line is low, the CE (chip enable) signal can activate the UART 19 as discussed below.

The MI (machine cycle 1) terminal of the UART 19, in conjunction with the CLK signal discussed previously, allows synchronization of the UART 19 with the microprocessor 12 and 15 carried along bus 58 and line MI, as shown in FIGS. 5a-5d.

Line 57 CE (chip enable) connection to the UART 19 allows the UART chip 19 to read data from the data bus 14 and place data on the data bus 14 only when addressed by the microprocessor 12; the origin of the signal being the address bus 23 of the microprocessor 12, decoded as described in connection with FIG. 5d.

The B/A terminal of the UART 19 causes the device to recognize either port A (low signal applied) or port B (high signal applied). The signal is carried on line A1 of the address bus 23 of the microprocessor 12, as shown in detail in FIGS. 5b and 5d.

The C/D terminal of the UART 19 causes the device to interrupt signals on the data bus 14 as data (low signal applied) or as commands to the UART 19 from the microprocessor 12 (high signal input). The signal line A0 of the address bus 23 of the microprocessor 12 carries the signal, as shown in detail in FIGS. 5b and 5d.

Figure 5B:
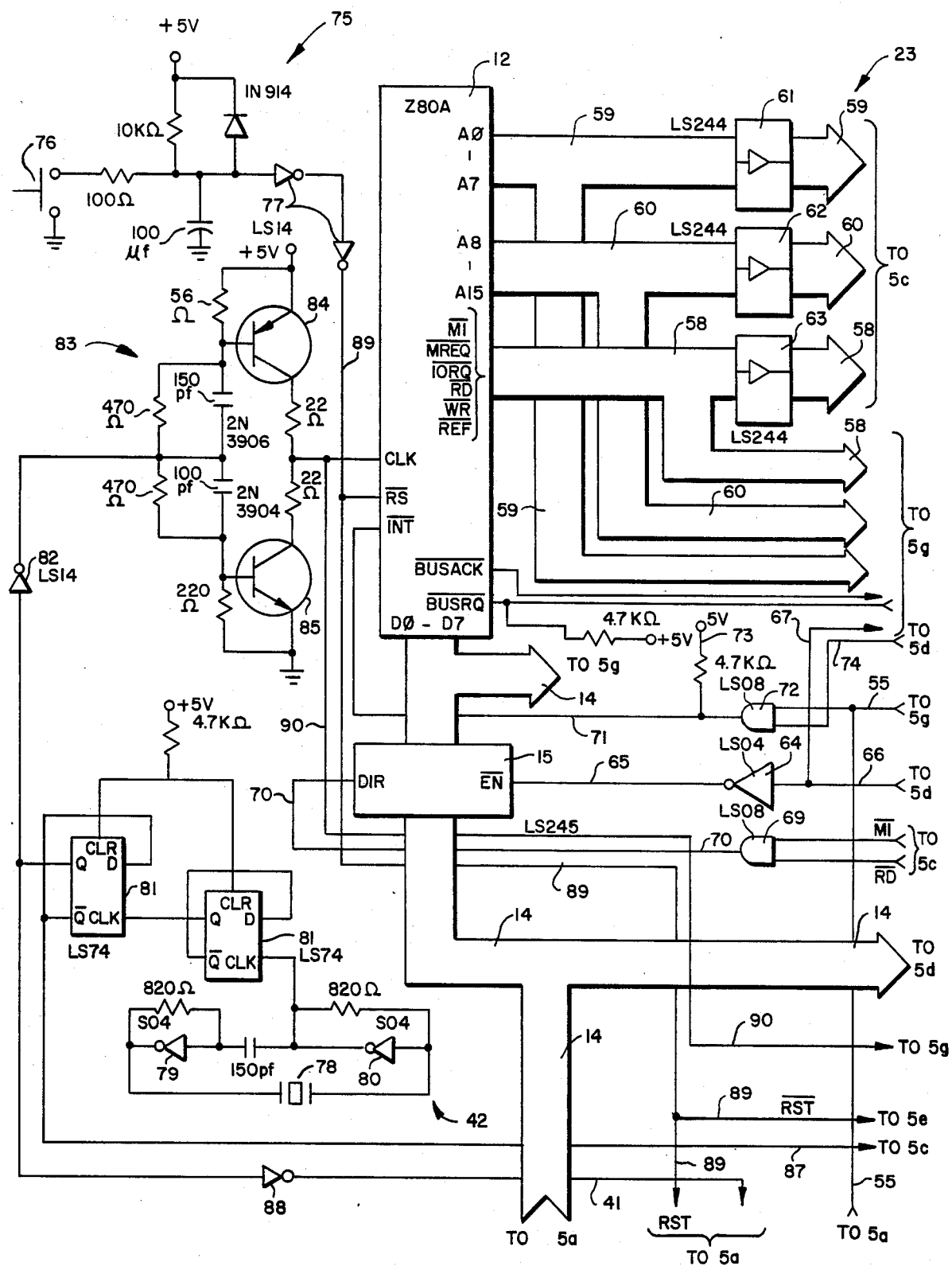

Referring now to FIG. 5b a typical realization of the circuitry for the microprocessor 12 used in the supervisory circuit 3 is shown. As stated previously an Z80A may be used for this purpose. The Z80A microprocessor 12 uses a 16 line address bus 23. The address bus 23 is split into two buses, the first address bus 59 contains address lines A0 through A7 and the second address bus 60 contains address lines A8 through A15. Both address buses 59 and 60 are passed directly to the DMA 37 (FIG. 5g) and, via the permanently enabled line drivers 61 and 62 to the decoding circuitry described in connection with FIG. 5c.

Figure 5C:
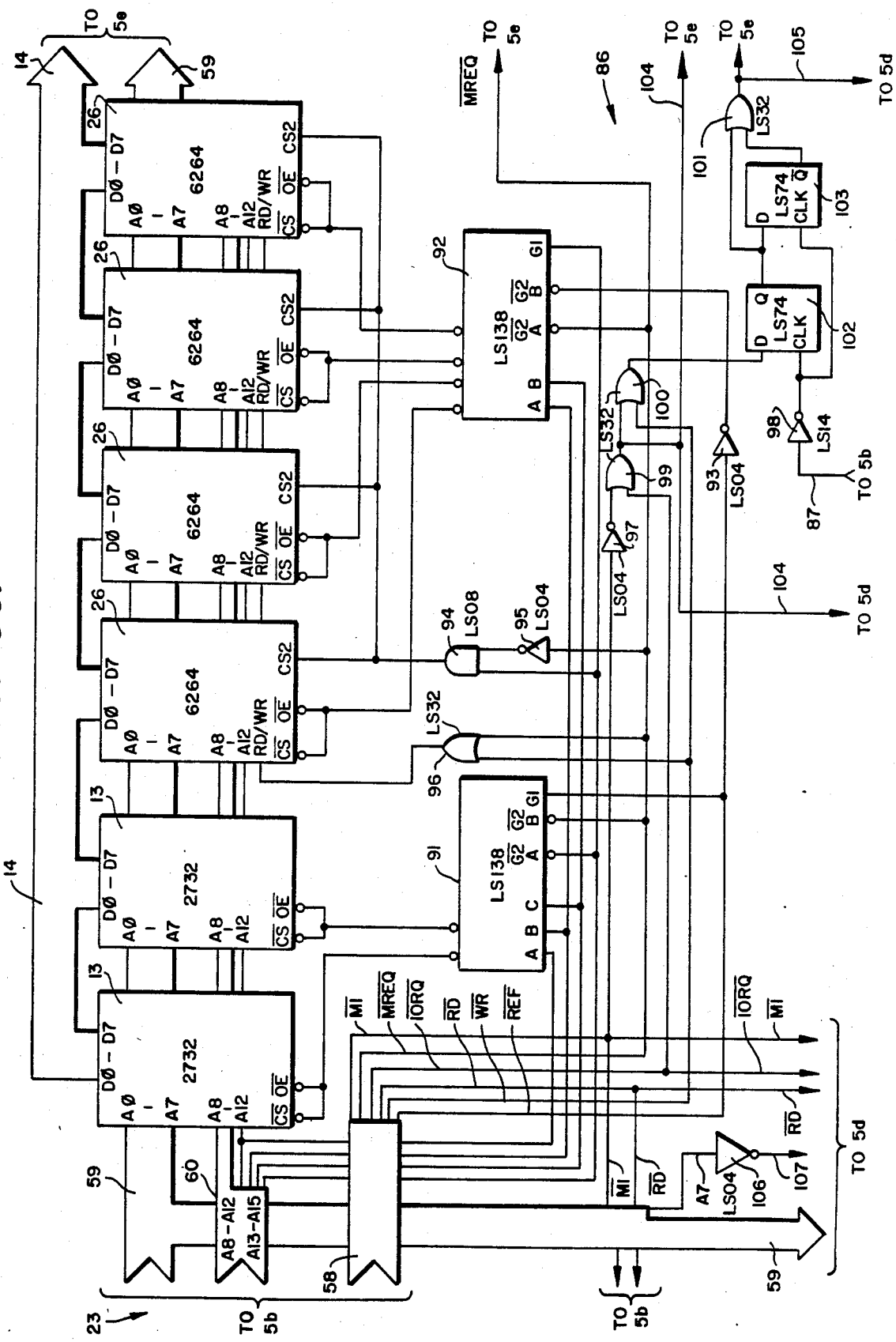
Figure 5D:
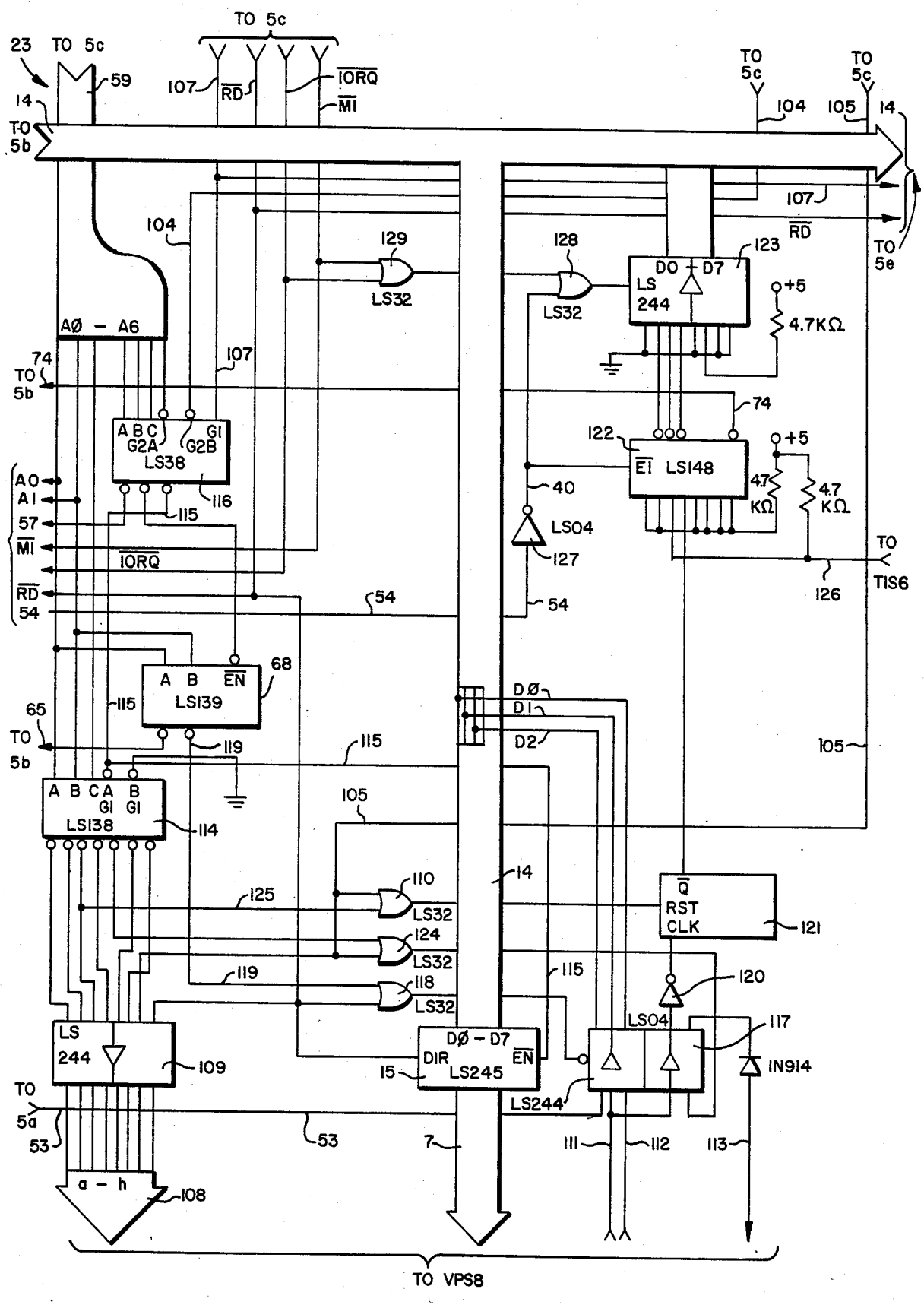

Six of the control terminals (MI, MREQ, IORQ, RD, WR, and REF, discussed briefly above) of the Z80A microprocessor 12 are formed into a control bus 58 and passed directly to the DMA 37 (FIG. 5g) and, via permanently enabled line driver 63, to the other circuits of the supervisor circuit 3 as shown in FIGS. 5c, 5d etc. The six signals in the control bus are:

MI (machine cycle 1): This output provides a signal which occurs when the first cycle of the microprocessor 12 commences, allowing (along with the clock signal) the synchronization of other devices with the operation of the microprocessor 12.

MREQ (memory request): This output provides a (low) signal when the program addresses a location in the memory section of the supervisor circuit 3 (see FIG. 5c).

IOREQ (input/output request): This output provides a (low) signal when the program addresses an input/out device in the supervisor circuit 3, for instance, the UART 19 described in FIG. 5a.

RD (read): This output provides a (low) signal when the program causes the memory location or device addressed to read the contents of the data bus 14.

WR (write): This output provides a (low) signal when the program causes the memory location or device addressed to write information to the data bus 14.

REF (refresh): This output provides a (low) signal to allow dynamic memories to undergo the refreshment process. Dynamic memories are not used in the illustrated circuitry; the signal being used only to disable operation during the time that the microprocessor 12 has set aside for the refreshment process.

The BUSACK and BUSRQ (bus acknowledge and bus request) signals are used in connection with the operation of the DMA 37 described in connection with FIG. 5g. Upon receiving a low signal on the BUSRQ line the microprocessor 12 turns the supervisor circuit 3 buses 14 and 23 over the the control of the DAM 37 and acknowledges this action by providing a low signal on the BUSACK line.

The Z80A microprocessor 12 uses an 8 line data bus 14. The data bus 14 is passed directly to the DMA 37 (FIG. 5g) and, via the bus connector device 15, to the rest of the supervisor circuit 3. As explained previously in relation to FIG. 2, the bus connector 15 can isolate the two sections of the data bus 14 which it connects if the EN (enable) input is high, or depending on the setting of the DIR (direction) input, can pass data in one or the other direction along the sections of the data bus 14 which it is connected to if the EN input is low.

The EN signal for the bus connector 15 is derived from the not gate 64 and carried on line 65 which, in turn, is driven from a decoded address signal carried on line 66 from a decoder 68 shown in FIG. 5d. The same decoded address signal is passed by line 67 to the chip enable terminal (CE) of the DMA 37 (FIG. 5g) which also requires a low signal to operate. Because of the inversion produced by the not date 64, however, the bus connector 15 is open whenever the DMA 37 is actuated and passes data to the rest of the supervisor circuit 3 only when the DMA 37 is not enabled. The correct direction of data flow is established by the DIR signal carried by line 70 to the bus connector 15, received from the gate 69 which is in turn driven by the MI and RD signals from the microprocessor 12 as discussed above, and shown routed through bus 58 in FIGS. 5b and 5c.

The INT (interrupt) signal may be applied to the microprocessor 12, along the 71, by the DMA 37 (FIG. 5g), by the UART 19, (FIG. 5a) by the VPS 8 or by the TIS 6, in that order of priority. When the microprocessor 12 receives an interrupt signal (INT low), it looks on the data bus 14 to find the address of the appropriate program routine to service the interrupt. The method of establishing the interrupt priority and placing the interrupt vector on the data bus 14 is described in connection with FIGS. 5a–5g describing each of the devices, respectively.

The INT signal itself is derived from and gate 72 the output of which is pulled high by the connection to the 5 V line 73. The and gate 72 is driven by lines 55 and 74. The signal on line 55 is generated by the INT output of the DMA 37 (FIG. 5g) or by the INT output of the UART 19 (FIG. 5a); the signal on line 74 is generated by the INT output of the VPS 8 or the INT output of the TIS 6, as discussed hereinafter (FIG. 5d). Polarities and logic are set so that if any of the four devices (DMA 37, UART 19, VPS 8 or TIS 6) generates an interrupt signal, it will drive the INT input of the microprocessor 12 low, thus initiating the interrupt process. Note, however, that the priority setting system prevents more than one device from simultaneously supplying an interrupt signal.

The reset circuitry 75, causing a reset (RST) signal, is actuated by pushbutton 76 or in the process of applying power to the supervisor circuit 3; the RST signal is cleaned by the not gates 77 and applied to the RST (reset) terminal of the microprocessor 12 and passed to other circuitry requiring a reset signal (FIGS. 5a and 5c) by line 89.

The clock signal (CLK) for driving the microprocessor 12 is derived from a crystal controlled oscillator 78 of the masterclock 42 using not gates 79 and 80 as active elements. The CLK signal is cleaned, sharpened, and isolated by flip-flop latches 81, not gate 82, and the push-pull amplifier 83 which uses transistors 84 and 85 as active elements. The desired operating frequency for the microprocessor 12 is 4 mHz, therefore, because the flip-flop latches 81 divide the signal by four, the oscillator 78 is operated at a crystal frequency of 16 mHz. The 4 mHz clock signal (CLK) is also passed to the delay circuit 86 by line 87, as described in connection with FIG. 5c, to the UART 19 (FIG. 5a) by line 41 through isolating not gate 88, and to the DMA 37 (FIG. 5g) by line 90.

FIG. 5c shows the memory circuit. Two types of memory chip are used in this typical realization: ROM 13 (read only memory) containing the program described in detail in connection with FIG. 3 and RAM 26 (random access memory) used to cache information being transferred between host computer 2 and VPS 8 and TIS 6. Two memory chips are used for ROM 13, each one being organized as an 8K×8-bit device, and four memory chips are used for RAM 26, each also being organized as an 8K×8-bit device. The data terminals D0–D7 of each memory device 13 and 26 are attached directly to a segment of the central data bus 14. The address terminals of the memory chips 13 and 26 are all attached to the first address bus 59 containing address lines A0 through A7 and to the first five lines of the second address bus 60, being address lines A8 through A12. The active memory chip 13 or 26 is selected by driving the CS (chip select) and OE (output enable) terminals of the selected memory chip low, using signals from decoders 91 and 92. These decoders 91 and 92, in turn, are driven by signals from address lines A12 through A15 of address bus 60.

The decoders 91 and 92 are also used to deactivate memory circuits during the refresh cycles by a signal from the REF line of bus 58 applied to terminal G1 of decoder 91 and, by way of not gate 93, to terminal G2B of decoder 92. The memories 13 and 26 are only active if a low signal is placed by the microprocessor 12 on the MREQ line in bus 58. The ROMs 13 are activated by the MREQ signal applied to terminal G2B of decoder 91. The RAMs 26 are activated by the MREQ signal applied to terminal CS2 (chip select 2) of RAMs 26 by the logic circuit formed by gate 94 and not gate 95. Additionally, the RAMs 26 are instructed to read or write by a signal applied to their RD/WR (read/write) terminals by or gate 96 which, in turn, is driven by the WR line of bus 58 in coincidence with the MREQ signal discussed above.

The delay circuit 86 formed by not gates 97 and 98, or gates 99, 100 and 101, and flip-flop latches 102 and 103 is driven by signals MI, IORQ, WR, and the 4 mHz microprocessor 12 clock signal 87. The delay circuit 86 introduces a slight delay in the writing of data to the TIS 6 and VPS 8 through the signals carried on lines 104 and 105 as explained in connection FIGS. 5d and 5e. The delay allows the data signal to settle, to a void interference, before it is clocked into the assigned memory location.

The VPS 8 interface circuitry shown in FIG. 5d requires address lines A0 through A6 on address bus 59 and an inverted signal from the signal carried on address line A7 on address bus 59. The inversion on line A7 is produced by not gate 106 supplying address line 107, as shown in FIG. 5c. The RD, IORQ and MI lines are also supplied to the VPS 8 interface circuitry shown in FIG. 5d, for use as described below. The MI and RD lines are also supplied to the bus connector 15 circuitry shown in FIG. 5b as described previously.

FIG. 5d shows a detailed realization of the required circuit interface with the VoiceTek Corporation Model 30 VPS 8. The Model 30 exchanges control information (not to be confused with the audio signals which it processes) by means of an 8-line control bus 108 driven by a permanently enabled line driver 109, an 8-line data bus 7, a data ready line 111, a buffer ready line 112, and a reset line 113, discussed in more detail hereinafter. The VPS 8 control bus 108 lines are designated 108a through 108h. They have the following functions and are generated by the supervisor circuit 3 in the following ways:

Line 108a WRDDSEL (write data select): Write signals are developed when the supervisor circuit 3 wishes to pass data from the host computer 2 to the VPS 8. A low WRDDSEL signal must coincide with the WR signal (line 108g, see below) to write data to the VPS 8. The WRDDSEL signal is generated by decoder 114 which decodes the first three lines A0, A1 and A2 of the address bus 59.

Line 108b RDDSEL (read data select): Read signals are developed when the VPS 8 wishes to pass data to the host computer 2 through the supervisor circuit 3. A low RDDSEL signal must coincide with the RD signal (line 108h, see below) to allow the VPS 8 to place data on the data bus 7 for the host computer 2 to read. The RDDSEL signal is generated by the decoder 114 which decodes the first three lines A0, A1 and A2 of the address bus 59.

Line 108c DATACK (data acknowledge): The supervisor circuit 3 drives this line low in coincidence with a WR signal (line 108g, see below) to indicate to the VPS 8 that a complete command/data string has been received. The DATACK signal is generated by the decoder 114 which decodes the first three lines A0, A1 and A2 of the address bus 59.

Line 108d SERREQ (service request): The supervisor circuit 3 drives this line low in coincidence with a WS signal (line 108g, see below) to indicate to the VPS 8 that the end of a command/data string from the host computer 2 has been reached. The SERREQ signal is generated by the decoder 114 which decodes the first three lines A0, A1 and A2 of the address bus 59. Line 108e WRSYNC (write sync): The supervisor circuit 3 drives this line low in coincidence with a WS signal (line 108g, see below) to indicate to the VPS 8 that a command/data string is about to be transmitted. The WRSYNC signal is generated by the decoder 114 which decodes the first three lines A0, A1 and A2 of the address bus 59.

Line 108f RDSYNC (read sync): The supervisor circuit 3 drives this line low in coincidence with a WS signal (line 108g, see below) to syncronize a command/data string before it is read. The signal is generated by the decoder 114 which decodes the first three lines A0, A1 and A2 of the address bus 59.

Line 108g WS (write strobe): This low signal is carried by line 105 and generated by the delay circuit 86, as described in connection with FIG. 2c to enable the placement of data.

Line 108h (read): This low signal is the read signal generated by the supervisor circuit's microprocessor 12 and carried on line RD via FIG. 5c (see the description provided in connection with FIG. 5b).

The VPS 8 data bus 7 gains access to the supervisor circuit's data bus 14 through bus connector 15. The direction of data flow is determined by the presence or absence of the RD signal from the microprocessor 12. The bus connector 15 is enabled by a signal carried on line 115 from decoder 116, which decodes address lines A3, A4 and A5 of address bus 59.

Line 111 DATRDY (data ready) provides a low signal from the VPS 8 signifying that it is holding a command/data string in its buffer to be transferred to the supervisor circuit 3. As indicated previously, such transfers are made by an interrupt. The DATRDY signal is placed directly on line D1 of the data bus 14 when line driver 117 is enabled by a signal from or gate 118 which, in turn, is actuated by the RD line and a signal carried on line 119 from decoder 68, decoding address lines A0 and A1 of address bus 59.

Line 111 carries an interrupt signal and it is also applied to the second half of line driver 117. This half of the line driver 117 is always active and generates the interrupt by driving not gate 120 and flip-flop latch 121 which, in turn, drives the decoder 122. The decoder 122 generates a signal, carried on line 74 to interrupt the microprocessor 12 (as described in connection with FIG. 5b) and also places a vector for the interrupt routine on the data bus 14 through line driver 123. Or gate 110 resets flip-flop latch 121 when activated by signals from the write strobe WS signal carried by line 105 and from decoder 114.

Line 112 carries a BUFRDY (buffer ready) low signal from the VPX 8 when its buffer is ready to receive a command/data string from the supervisor circuit 3. This BUFRDY signal is placed directly on line D2 of the data bus 14 when line driver 117 is enabled by a signal from or gate 118 which, in turn, is actuated by the RD line and a signal carried on line 119 from decoder 68, decoding address lines A0 and A1 of address bus 59.

Line 113 carries a RESET (reset) signal to the VPS 8 through line driver 117. The RESET signal is generated by or gate 124 which is driven by the write strobe WS signal carried by line 105 and a signal carried on line 125 and generated by the decoder 114 which decodes three address lines A0, A1, and A2 of the address bus 59.

The interrupt routine described above can be initiated by a signal from the TIS 6 carried on line 126 from the TIS 6 (in case a data transfer can be accomplished more efficiently by interrupt rather than by the polling process described previously). Because decoder 122 generates a different signal when an interrupt is produced by the TIS 6, a different vector is placed on the data bus 14, directing the microprocessor 12 to a routine suitable for serving a TIS 6 interrupt. The connections therefore establish the priority of the VPS 8 interrupt over the TIS 6 interrupt.

Line 54 derives from the UART 19 (described in connection with FIG. 5a) and the signal it carries establishes the priority of UART 19 interrupts over interrupts from the VPS 8 and the TIS 6 by virtue of its connection via not gate 127 and line 40 to decoder 122 and via or gate 128 to line driver 123, which is also controlled by not gate 129 in response to the IORQ and MI signals generated by the microprocessor 12.

The 37.5 Hz clock signal carried on line 53 described in connection with FIG. 5a is placed on line D2 of the data bus 14 through the gated section of line driver 117. Other connections shown in FIG. 5d are provided to gate the various decoders and other devices to operate only at appropriate times in the program cycle.

Figure 5E:
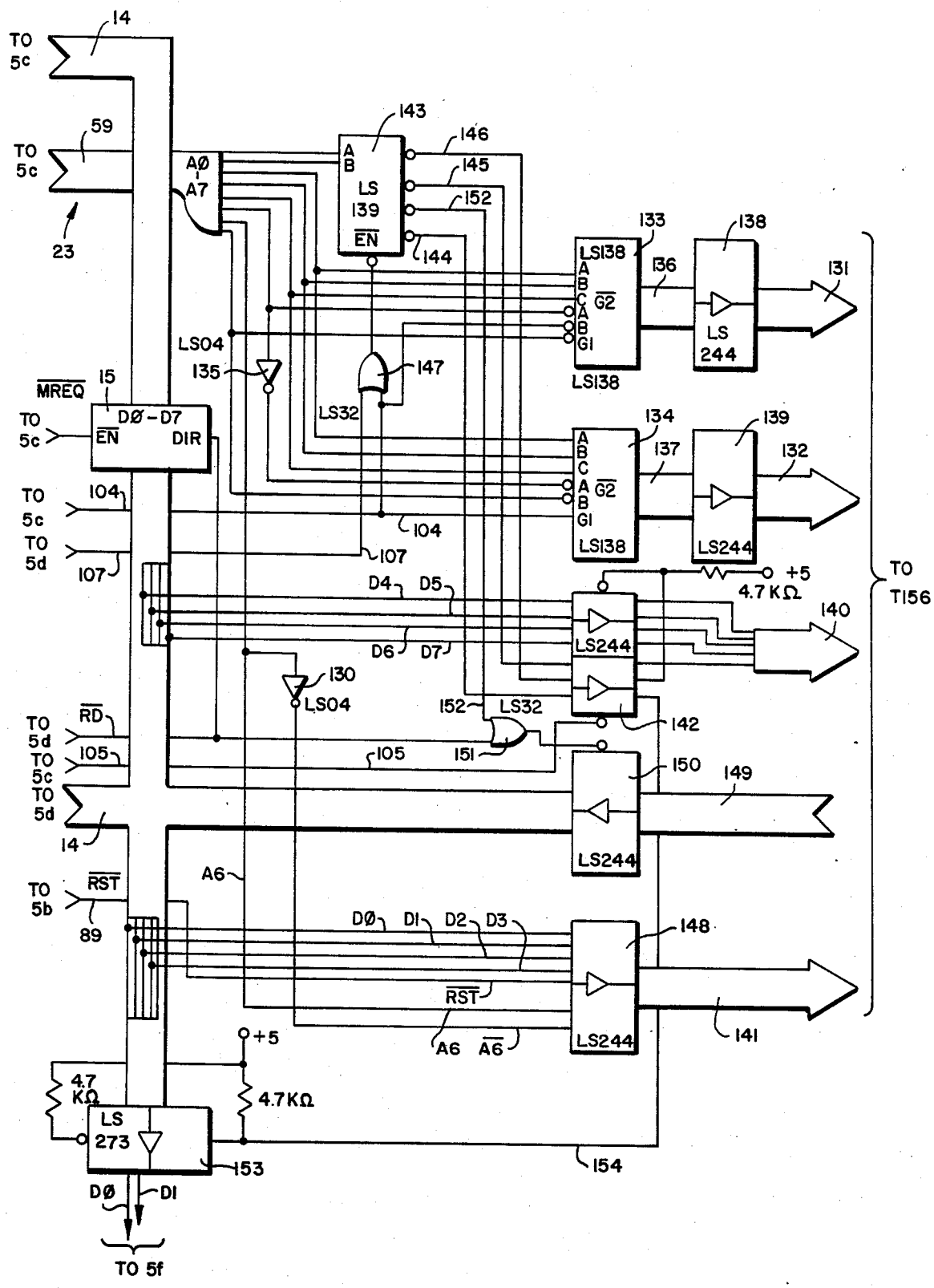

FIG. 5e shows the interface between the supervisor circuit 3 and the telephone interface system (TIS) 6; the circuit shown is appropriate for connection to the VoiceTek Model 50 TIS 6.

The Model 50 can handle up to 32 telephone lines. In order to initiate inquiries on the status of a telephone line the model 50 expects the supervisor circuit 3 to address the telephone line in question. The telephone lines are divided into two groups of sixteen. Address line A6 on bus 59 of the supervisor circuit 3 is used to designate which group of telephone lines is to be addressed. The particular telephone line is then designated by signals as described below. When the signal on line A6 is high, the first group of 16 telephone lines is enabled; when the signal on line A6 is low a high signal is developed by not gate 130 which enables the second group of 16 telephone lines.

Within each group of 16, a specific telephone line is selected by signals carried on the two 8-line buses 131 and 132. Supervisor circuit 3 address bus lines A2 through A5 carried on bus 59 are used to address the individual telephone lines; the signals carried by those lines are decoded by decoders 133, 134 and not gate 135. The 8-line buses 136 and 137 carrying the decoded signals are supplied to the 8 line busses 131 and 132 and then to the TIS 6 by the two permanently enabled line drivers 138 and 139.

Bus 140 and bus 141 transfer commands to the TIS 6. Bus 140 passes the signal contents of lines D4 through D7 of the data bus 14 through the first half of line driver 142; these lines actuate off hook, reset digit/ring, on hook, and trunk reset signals for the telephone line addressed. The line driver 142 is enabled by a signal carried on line decoded by decoder 143, which is actuated by lines A0 and A1 of the supervisor circuit 3 address bus 59. Bus 140 also contains a line to the trunk strobe of the Model 50 TIs 6; this signal is derived from decoder 143 and is applied through the second half of line driver 142 by line 146 when the line driver 142 is enabled by the write strobe signal carried by line 105. Decoder 143 is in turn enabled through or gate 147 driven by line 104 and by line 107.

Bus 141 passes the contents of lines D0 through D3 of the data bus 14 through permanently enabled line driver 148. These lines D0 through D3 actuate VPS-0 through VPS-4, assigning one of the various voice paths that the TIS 6 can employ. The bus 141 also contains a RST (Reset) line to reset the TIS 6 and the address lines described above (A6 and inverted A6).

Status information about the telephone line addressed is passed directly to lines D0 through D7 of supervisor circuit 3 data bus 14 by bus 149 through line driver 150.

The signals, eight in number, are as follows: the first four are BCD (binary coded decimal) representation of decoded touch-tone signals on the telephone line; the others, in order, are a hook change signal, an off hook signal, a digit assembled signal, and a trunk identification signal. Line driver 150 is enabled through or gate 151 by a signal carried by line 152, decoded from address bus lines A0 and A1 by decoder 143 and by the RD signal.

Lines D0 and D1 of the supervisor circuit 3 data bus 14 are used to clock the tone circuits which require interruption (see below). They are passed to the tone generator circuit (see FIG. 5f) by line driver 153 which is enabled by a signal carried on line 154 from decoder 143 via line 144 when the write strobe signal carried on line 105 enables line driver 142.

FIG. 5e also shows one of the bus connectors 15 used to establish the flow of data on the supervisor circuit's data bus 14. The bus connector 15 is enabled by the MREQ signal; direction is established by the RD signal. Finally, note that the gating circuits of the decoders 143 and 134 are connected through line 104 to enable these circuits at the proper program segments, which may also include the connection through not gate 135.

Figure 5F:
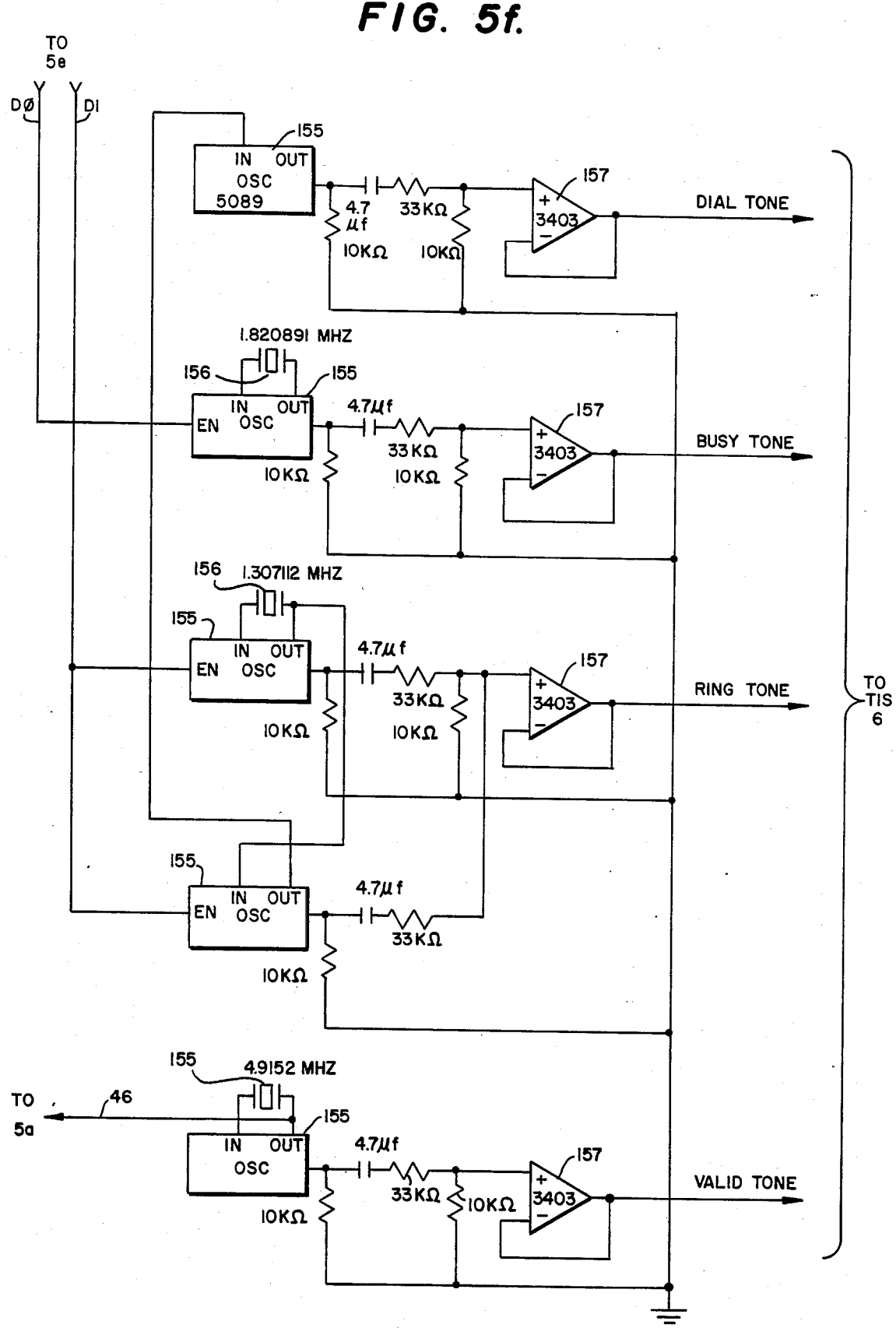

FIG. 5f shows the tone generating circuit. The TIS 6 will place one of four telephone tones on a telephone line's audio circuit: a dial tone, a busy tone, a ring tone, or a valid tone. These tones are generated by the supervisor circuit 3 and passed to the TIS 6, as described generally, previously. The tones are generated by tone generating chips 155 using appropriate crystals 156 to establish the appropriate audio frequencies. The lines to the TIS 6 are driven by operational amplifiers (op. amps) 157. The tones requiring interruption (busy and ring) are interrupted by signals placed on a segment of the data bus 14 as described above. The crystal 155 which establishes the frequency of the valid tone is also carried by line 46 and used to feed the clock circuit described in connection with FIG. 5a.

The direct memory access (DMA) circuit is shown in FIG. 5g. The circuit consists of a single DMA chip 37; the Z80A DMA is illustrated. The DMA chip 37 is used to enable disk-to-disk or other bulk data transfers in the background of supervisor circuit 3 operation as described previously. Connections to the DMA chip 37 include the supervisor circuit address buses 59 and 60, control bus 28, and data bus 14. It should be noted that one line of the control bus 28, the REF line, is not required by the DMA chip 37.

The DMA chip 37 functions by taking over control of the supervisor circuit buses 14, 58, 59 and 60 from the microprocessor 12; it then transfers data between I/O devices and memory without the intervention of the microprocessor 12, thereby speeding such transfers. It requests bus control by driving line the BUSRQ line low; this line is connected directly to the BUSRQ input of the microprocessor 12, as described previously. After transferring control of the buses 14, 58, 59 and 60 to the DMA 37, the microprocessor 12 places a low signal on its BUSACK (bus acknowledge) output; this signal is passed directly to the BA1 input of the DMA chip 37. The DMA chip 37 also requires a clock input the CLK signal used by the microprocessor 12 is also passed to the CLK (clock) input of the DMA 37.

The DMA 37 interrupts operation of the microprocessor 12 by placing a low signal on line 55; the DMA chip 37 can then place a vector to the appropriate routine on the data bus 14. The priority of DMA 37 interrupts is established by holding the IEO (interrupt enable output) of the DMA 37 high at all times. The IEO of the DMA 37 is connected by line 56 to the IEO input of the UART 19.

Operation of the DMA 37 is enabled by a low signal on line 67 to the CE (chip enable) input of the DMA 37; this signal is derived (via FIG. 5b) from a decoder 68 circuit described in connection with FIG. 5d. Finally, the RDY (ready) input of the DMA 37 is actuated by line 54 from the IEO (input enable output) of the UART 19 to prevent overflow of the UART 19 buffer when the DMA 37 is active.

The invention has now been described in connection with a preferred embodiment. Further modifications will also occur to those skilled in this art, and such are considered to fall within the spirit and scope of the invention as defined in the appended claims.

What is claimed is:

1. In a system for digital recording and playback of voice messages and that includes a host computer, a telephone interface to telephone lines, and a voice processor, the voice processor being connected to the telephone interface by analog audio lines for transmitting voice messages therebetween and having means for converting voice messages into digital signals and for converting digital signals into voice messages, an electronic communications supervisor that is independent of said host computer and that is connected as communications intermediary between said host computer and said telephone interface and said voice processor, said supervisor comprising programmed digital signal processing means for controlling the operation of the supervisor and digital memory means for storing digital signals to be communicated under the control of said processing means, said supervisor having parallel means for communication of digital signals in parallel format with respect to both of said telephone interface and said voice processor, having serial means for communication of digital signals in serial format with respect to said host computer and having means for translating between said formats, said digital signal processing means controlling communication between said host computer, said telephone interface, and said voice processor.

2. A system in accordance with claim 1, wherein said supervisor includes means for generating telephone tones for communication to said telephone interface.

3. A system in accordance with claim 1, wherein said supervisor includes means for providing timing signals for timing periods of activity on said telephone lines.

4. A system in accordance with claim 1, wherein said supervisor includes direct memory access means for processing transfers of large blocks of digital signals between said voice processor and said host computer.

5. A system in accordance with claim 1, wherein said supervisor includes means for prioritizing digital signals for communication with respect to said host computer, said telephone interface, and said voice processor.

6. A system in accordance with claim 1, wherein said digital signals processing means of said supervisor sequentially polls said telephone lines to determine active telephone lines.

7. A method of enabling the efficient use of a host computer with a voice message processing apparatus including a telephone interface to telephone lines and a voice processor connected to said telephone interface by audio signal lines, that comprises providing a programmed processor-controlled electronic communications supervisor independent of said host computer and connected as a communications intermediary between the host computer and the telephone interface and the voice processor, and performing the following steps with said supervisor:

controlling communication of digital signals in serial format with respect to said host computer, controlling communication of digital signals in parallel format with respect to said telephone interface and said voice processor, translating digital signals between said formats, whereby said host computer may communicate with said telephone interface and said voice processor, and controlling communication of voice messages between said voice processor and said telephone interface along said audio signal lines.

8. A method in accordance with claim 7, wherein said supervisor performs the further step of prioritizing digital signals for communication with respect to said host computer, said telephone interface, and said voice processor.

9. A method in accordance with claim 7, wherein said supervisor performs the further steps of storing digital signals for controlling said telephone interface and said voice processor and transmitting the stored digital signals to said telephone interface and said voice processor to control the operation thereof.

10. A method in accordance with claim 7, wherein said supervisor performs the further step of generating telephone tones and communicating the same to said telephone interface.

11. A method in accordance with claim 7, wherein said suppervisor performs the further step of sequentially polling said telephone lines to determine active telephone lines.

* * * * *